United States Patent [19]

Hinkebein

[11] Patent Number: 4,484,950
[45] Date of Patent: Nov. 27, 1984

[54] COMPOSITES OF SULFUR AND CRYSTALLINE PHOSPHATE FIBERS

[75] Inventor: John A. Hinkebein, Manchester, Mo.

[73] Assignee: Monsanto Company, St. Louis, Mo.

[21] Appl. No.: 491,611

[22] Filed: May 4, 1983

[51] Int. Cl.³ ............................................. C09K 3/00
[52] U.S. Cl. ........................... 106/287.29; 106/287.32
[58] Field of Search ...................... 106/287.29, 287.32

[56] References Cited

U.S. PATENT DOCUMENTS

| | | | |
|---|---|---|---|
| 3,306,000 | 2/1967 | Barnes | 52/747 |
| 3,316,115 | 4/1967 | Barnes et al. | 106/287 |
| 3,434,852 | 3/1969 | Louthon | 106/17 |
| 3,453,125 | 7/1969 | Williams | 106/19 |
| 3,459,717 | 8/1969 | Signouret | 260/79 |
| 4,233,082 | 11/1980 | Simic | 106/287.23 |
| 4,346,028 | 8/1982 | Griffith | 524/417 |
| 4,360,625 | 11/1982 | Griffith | 524/414 |

OTHER PUBLICATIONS

Monsanto Brochure "Phosphate Fibers" 1981.

*Primary Examiner*—Theodore Morris
*Attorney, Agent, or Firm*—Wendell W. Brooks; James C. Logomasini; Arnold H. Cole

[57] ABSTRACT

Composites possessing desirable properties are produced from compositions comprising molten elemental sulfur and crystalline phosphate fibers. These composites are useful for the fabrication of various structures, such as tanks, pipes, sheeting, pavement surfaces and the like.

10 Claims, No Drawings

COMPOSITES OF SULFUR AND CRYSTALLINE PHOSPHATE FIBERS

This invention relates to sulfur composites reinforced with crystalline phosphate fibers. More particularly, it relates to composites comprising elemental sulfur and crystalline phosphate fibers selected from acicular crystalline calcium metaphosphates or asbestiform crystalline calcium sodium or lithium phosphates. This invention also relates to articles fabricated with sulfur reinforced with the crystalline phosphate fibers.

BACKGROUND OF THE INVENTION

Elemental sulfur is known to be moldable, but the low tensile strength and brittleness of the resultant product makes it unsuitable for many purposes. Modified or plasticized sulfur has been used in building construction, as flooring surfaces, for roadway paving and roadway marking in view of its excellent adhesion to substrates and resistance to abrasion and corrosion. For example, sulfur concrete has been used to fabricate corrosion-resistant tanks and as flooring surfaces in highly corrosive areas. The sulfur concrete can be made by adding 5% by weight of a chemical modifying agent to molten sulfur at 130° C. The modified sulfur is then added to aggregate which has been heated to 155° C. and mixed thoroughly and then cast. Usually the composition of the sulfur concrete is 15%–25% modified sulfur and 75%–85% aggregate by weight. Various materials such as crushed rock, sand, colorants, mica, glass beads, glass fibers and asbestos have been used with chemically-modified sulfur.

Chemically-modified sulfur mixtures are disclosed in various U.S. Patents. For example, U.S. Pat. No. 3,306,000 describes a method of bonding building blocks with a plasticized sulfur composition consisting essentially of sulfur, a polysulfide polymer plasticizer and glass fibers. U.S. Pat. No. 3,316,115 describes marking compositions of sulfur and a polysulfide polymer plasticizer, which may contain additionally glass beads, sand, pigment, glass fibers and the like. U.S. Pat. No. 3,459,717 describes sulfur-based plastic compositions containing sulfur, a monoethylenically unsaturated hydrocarbon and diester of dithiophosphoric acid which may also contain glass fiber, yellow pigment, glass beads and the like. U.S. Pat. No. 4,233,082 describes plasticized sulfur coating compositions which contain elemental sulfur and aliphatic linear polysulfides and an aromatic polymeric polysulfide and an inorganic filler selected from mica and asbestos. While the above described sulfur composites are satisfactory for application to substrates, there is a need for much stronger sulfur composite, free of hazardous asbestos, for the fabrication of structures such as pipes, fittings, tanks and the like.

SUMMARY OF THE INVENTION

It has now been discovered that sulfur composites having exceptional strength can be made from elemental sulfur and crystalline phosphate fibers selected from acicular crystalline calcium metaphosphate or asbestiform crystalline calcium M phosphate wherein M is sodium or lithium.

The crystalline phosphate fibers are such that the reinforced sulfur composites retain the corrosion resistance and durability associated with sulfur composites. Another advantage of this invention is that strong, durable, corrosion-resistant sulfur composites can be formed without the use of asbestos which is considered an extreme health hazard.

The crystalline phosphate fibers employed in the composite of this invention contribute unique reinforcing properties, that is, tensile strength, to the composite. Although I do not wish to be bound by theory, it is believed that the exceptional reinforcing properties of the crystalline phosphate fibers is due particularly to the surface characteristics of the individual fibers and the excellent adhesion of the molten sulfur to the individual fibers.

DETAILED DESCRIPTION OF THE INVENTION

Elemental sulfur, useful in accordance with the present invention, is available in various commercial grades such as: "bright" sulfur, refined sulfur, which is available in lumps and cast forms and flours of sulfur which is the powdered form of sulfur produced by sublimation.

The crystalline phosphate fibers useful in accordance with this invention are selected from the group consisting of acicular crystalline calcium metaphosphate and asbestiform crystalline calcium M phosphate wherein M is sodium or lithium.

The acicular crystalline calcium metaphosphate fibers are high-molecular weight phosphates, $[Ca(PO_3)_2]_n$ having an aspect ratio (the length to average diameter ratio) of at least 10:1 and usually greater than about 40:1, and average diameters in the range of 6–40 microns. Particularly preferred acicular fibers are those having an aspect ratio of greater than 40:1 and average diameters in the range of 7 to 10 microns. Details of the preparation, the crystallinity and other properties of the acicular crystalline calcium metaphosphate fibers are described in U.S. Pat. No. 4,360,625 issued Nov. 23, 1982 to E. J. Griffith, the disclosure of which is herein incorporated by reference.

The asbestiform crystalline calcium M phosphates wherein M is sodium or lithium are high-molecular weight phosphates, $[CaM(PO_3)_3]_n$ having an aspect ratio of at least 10:1 and an average diameter in the range of 1 to 20 microns. Particularly preferred are asbestiform fibers having an aspect ratio of about 40:1 to about 100:1 and an average diameter in the range of 1 to 10 microns. Details of the preparation, the crystallinity, and other properties of asbestiform crystalline calcium M phosphate fibers are described in U.S. Pat. No. 4,346,028 issued Aug. 24, 1982 to E. J. Griffith the disclosure of which is herein incorporated by reference.

The amount of crystalline phosphate fibers incorporated into molten elemental sulfur can vary over a broad range depending upon the amount of reinforcement required and the intended use of the composite. Generally, advantageous reinforcement can be obtained with as little as 2 parts per 100 parts sulfur up to 100 parts or more of the fiber per 100 parts sulfur. As will be apparent to those skilled in the art the ratio of fiber content to sulfur depends on the desired properties of the composite and its intended use.

The composites of this invention, preferably comprising from about 10 to about 50 parts of the crystalline phosphate fibers per 100 parts sulfur, provide strong, corrosion-resistant products having good machining properties, such as sawing, boring and the like. Such composites are particularly suitable for the fabrication of conduits, pipes, shingles, flat or corrugated sheeting and the like useful as replacement for asbestos-cement. Such materials have the advantage of rapid cure to full strength allowing at-the-site fabrication and avoiding the prolonged cure time and health hazard associated with asbestos-cement products. Further, products, such as, pipes and fittings fabricated with the composites of this invention can be conveniently chemically welded using carbon disulfide as a solvent.

In addition to the crystalline phosphate fibers and sulfur the composites can also contain chemical modifiers or plasticizers for the sulfur and other adjuvants such as viscosity modifiers, solvents, pigments, colorants, fillers, aggregates and the like.

Suitable modifiers or plasticizers for sulfur useful in the composite of this invention include for example the arylene and aliphatic polysulfides described in U.S. Pat. No. 3,316,115; the polythiols described in U.S. Pat. No. 3,434,852; the mercapto acids and alcohols described in U.S. Pat. No. 3,453,125; the unsaturated hydrocarbons with diesters of dithiophosphoric acid described in U.S. Pat. No. 3,459,717 and the aliphatic linear polysulfide with aromatic polymeric polysulfide in U.S. Pat. No. 4,233,082, the disclosures of said patents being incorporated herein by reference. Usually, the chemical modifier or plasticizer is reacted with molten sulfur prior to incorporating the crystalline phosphate fibers.

Preferred chemical modifiers for elemental sulfur are those modifiers which impart fire-resistance to the sulfur matrix. Such fire retardant modifiers can be phosphorous derivatives such as, the diesters of dithiophosphoric acid described in the above U.S. Pat. No. 3,459,717. Such fire retardant modifiers are particularly preferred for the composites of this invention which are to be used under conditions where there is a substantial risk of fire.

In general the composites of this invention can be prepared by various means to incorporate the crystalline phosphate fibers in elemental sulfur. For example, the crystalline phosphate fibers can be incorporated into molten sulfur with stirring or agitation. Alternatively, the crystalline phosphate fibers can be dry blended with sulfur powder to form a premix which is heated and agitated to melt the sulfur to form an intimate mixture which can be cast or molded or extruded. Also, molded composites can be fabricated by forming a mat of the crystalline phosphate fibers which is placed into a heated mold and then sulfur is added to the mold and allowed to melt and impregnate the fibers with pressure being applied to expel the excess sulfur.

Various dry adjuvants such as, pigments, colorants, fillers and the like can be readily incorporated into the composites of this invention by dry blending with the particulate sulfur and the crystalline phosphate fibers or by adding to the molten sulfur, preferably after the crystalline phosphate fibers have been incorporated.

Where it is desired to form composites of this invention with aggregates, such as, crushed rock, gravel, sand and the like, convenient to preheat the aggregate before adding the aggregate with agitation to the mixture of molten sulfur and crystalline phosphate fibers. Composites containing up to about 60% or more by weight aggregate can be useful for casting large tanks or vessels, pavements, flooring and the like which are strong, durable and corrosion-resistant.

The invention is further illustrated, but not limited to the following examples wherein all percents and parts are by weight unless otherwise indicated.

EXAMPLE 1

Asbestiform crystalline calcium sodium phosphate fibers were prepared from a composition containing 20.452 parts 85.2% phosphoric acid, 4.880 parts calcium carbonate 3.241 parts sodium carbonate and about 8.1 parts distilled water providing a mole percent ratio of 50.14% $P_2O_5$, 32.79% CaO and 17.06% $Na_2O$. A portion of the composition was placed in a shallow high temperature ceramic dish and heated to about 200° C. to drive off the water and the balance of the composition was added and again dried at about 185° C. in a furnace. Then the temperature of the dried composition was gradually increased to about 950° C. and maintained there to form a melt of the composition. The temperature of the melt was reduced and maintained at a temperature of 730° C. -690° C. for a period sufficient to allow crystallization of the melt. After crystallization was complete the composition was allowed to cool to ambient temperature and removed from the dish. The crystallized composition was fiberized by passing it through a jaw crusher then a disc mill and then hammer milled three (3) times to yield the asbestiform crystalline calcium sodium phosphate fibers.

The asbestiform fibers are thermally stable to about 740° C., have an average density of about 2.86 g/cc and generally a mean aspect ratio of about 40:1 to about 100:1.

In view of the difficulty of determining the mean aspect ratio of the crystallline phosphate fibers, the fibers were further characterized by determination of the surface area per gram of fiber.

A Fisher Sub-Sieve Sizer available from Fisher Scientific Co. was used to determine the porosity and surface area. From these measurements the packed bulk density and equivalent cylindrical diameter were calculated. This measurement operates on the air permeability principle for measuring the average surface area or size of particles. It is based on the fact that a current of air flows more readily through a bed of coarse particles than through a similar bed of fine particles.

The asbestiform crystalline calcium sodium phosphate fibers were further classified by screening into three (3) grades. Grade A was +16 mesh (1.19 mm), grade B was −16 mesh to +45 mesh (0.35 mm) and grade C was −45 mesh (USSS.). These asbestiform fibers consist of bundles of incompletely open fibrils. Upon further opening grade A had an average diameter of 5.3 microns and an average surface area of 2679cm$^2$/g; grade B had an average diameter of 6.6 microns and an average surface area of 2165cm$^2$/g and grade C had an average diameter of 8.9 microns and average surface area of 1599cm$^2$/g.

The strength of the composites of this invention is demonstrated by the following procedure.

15 grams of the crystalline phosphate fibers were suspended in 2.5 liters of water. This suspension was poured into a plexiglass box with inside dimensions of 12 inches high by 6 inches deep and 2 inches wide. The box was fitted with 100 mesh (0.149 mm) screen for the bottom and was standing in 7 inches of water. The suspension was stirred and the box was lifted out of the water to drain the water from the suspension and produce a mat of fibers. The mat was transferred to a 2 inch by 6 inch mold and placed in a drying oven at 130° C. After drying, sulfur was added to the mold in the oven at 130° and impregnated the fiber mat. The pre-heated top part of the mold was placed in the mold and a force of 1,000 lbs. was applied to expel the excess sulfur. The mold was permitted to cool with the pressure applied and the composite was removed. The composite was aged for 1 day to allow the sulfur to transform from monoclinic to the stable rhombic form. The composite was sawed into strips and the flexural strength and modulus was measured with an Instron Universal Testing Machine using ASTM test procedures (ASTM Part 35, D790-71, page 308).

After the thickness and width of the test strips have been measured, the sulfur is burned off and the volume % fibers in the composite is calculated.

The strength and modulus of the test pieces were calculated with the following equations:

$$S = 3LP_2/2bd^2$$

and $$E = L^3P_1/4bd^3(0.01)$$

where

L = span in inches = 2
$P_2$ = breaking load in pounds
b = sample width in inches
d = sample thickness in inches
$P_1$ = load for 0.01 inch deflection in pounds
S = breaking strength in p.s.i. (p.s.i. × 0.0703 = kg/cm$^2$)
E = flexural modulus in p.s.i. (p.s.i. × 0.0703 = kg/cm$^2$)

The composites made from the asbestiform crystalline calcium sodium phosphate using grade A had an average composite flexural strength of 12,422 p.s.i. (874.8 kg/cm$^2$) and an average composite modulus of $1.89 \times 10^6$ p.s.i. ($133 \times 10^3$ kg/cm$^2$) at a volume of 28% fibers (36.4 wt. %) The grade B had an average composite flexural strength of 10,210 p.s.i. (717.8 kg/cm$^2$) and a composite modulus of $1.86 \times 10^6$ ($131 \times 10^3$ kg/cm$^2$) at a volume of 25% fibers (32.5 wt. %). Grade C had an average composite flexural strength of 4,937 p.s.i. (347.1 kg/cm$^2$) and an average composite modulus of $2.41 \times 10^6$ ($169 \times 10^3$ kg/cm$^2$) at a volume of 36% fibers (46.8 wt. %).

EXAMPLE 2

Representative acicular crystalline calcium metaphosphate fibers were prepared from a composition consisting of 1473.7 parts of 86.13% $H_3PO_4$, 128.4 parts of $NaH_2PO_4 \cdot H_2O$, 450.0 parts $CaCO_3$, 9.6 parts Fe $PO_4$ and about 500 parts distilled water providing a mole percent ratio of 58.3% $P_2O_5$, 37.6% CaO, 3.9% $Na_2O$ and 0.3% $Fe_2O_3$. The ingredients were thoroughly mixed and the composition was dried at a temperature of about 200° C. Then the composition was placed in a shallow high-temperature ceramic dish and placed in a furnance and heated to 200° C. overnight to drive off residual water. The temperature was increased over a period of about six hours to 1000° C. and maintained at 1000° C. for about one hour to form a melt. The temperature of the melt was then reduced to about 710° C. over a period of about 2 hours and crystallization was induced by quick chilling by opening the furnance door for about five seconds. After the crystallization was induced the temperature was maintained at 710° C. overnight and the crystallized composition was cooled and removed from the furnance. Acicular crystalline calcium metaphosphate fibers were then recovered from the crystallized composition by breaking it into small chunks and boiling in water to dissolve the soluble matrix and filtering drying the separated fibers. The recovered acicular crystalline calcium metaphosphate fibers are relatively uniform and were not further classified. These acicular fibers are thermally stable to about 970° C., have an average density of about 2.87 g/cc and generally a mean aspect ratio of about 100:1. The acicular fibers had an average diameter of 7.2 microns and an average surface area of 2013 cm$^2$/g as determined using the above described Sub-Sieve Sizer.

Using the above described test procedure, the average strength of composite reinforced with the acicular crystalline calcium metaphosphate fibers provided an average composite flexual strength of 8682 p.s.i. (610.4 kg/cm$^2$) and an average composite modulus of $1.98 \times 10^6$ p.s.i. ($139 \times 10^3$ kg/cm$^2$) at a volume of 23% acicular fibers (29.9 wt. %).

EXAMPLES 3-7

Additional batches of asbestiform crystalline calcium sodium phosphate fibers were prepared using the general procedure of Example 1. Samples of this fiber of several batches were classified and evaluated as reinforcing fiber for unmodified elemental sulfur using the test procedure set forth in Example I with the following averaged results.

TABLE I

| Example No. | Diameter Microns | Area cm$^2$/g | % Fiber Volume | Composite(kg/cm$^2$) S | E |
|---|---|---|---|---|---|
| 3 Grade A | 5.1 | 2820 | 19 | 506.7 | 112 × 10$^3$ |
| Grade B | 7.1 | 2022 | 28 | 684.6 | 125 × 10$^3$ |
| Grade C | 7.9 | 1816 | 35 | 322.7 | 116 × 10$^3$ |
| 4 Grade A | 5.0 | 2872 | 25 | 813.5 | 127 × 10$^3$ |
| Grade B | 8.8 | 1623 | 28 | 682.3 | 129 × 10$^3$ |
| Grade C | 8.0 | 1786 | 24 | 211.0 | 117 × 10$^3$ |
| 5 Grade A | 3.4 | 4202 | 21 | 771.8 | 110 × 10$^3$ |
| Grade B | 5.4 | 2646 | 24 | 721.1 | 121 × 10$^3$ |
| Grade C | 10.7 | 1339 | 25 | 158.1 | 116 × 10$^3$ |
| 6 Grade A | 5.5 | 2582 | 16 | 604.3 | 98.4 × 10$^3$ |
| Grade B | 4.9 | 2935 | 25 | 830.4 | 127 × 10$^3$ |
| Grade C | 8.8 | 1623 | 41 | 311.3 | 152 × 10$^3$ |
| 7 Franklin* Fibers | 2.1 | 6334 | 21 | 93.6 | 93.5 × 10$^3$ |

*Trademark of U.S. Gypsum Company for anhydrous calcium sulfate fibers.

The data set forth in Table I demonstrates the exceptional strength of the sulfur composites reinforced with the crystalline phosphate fibers. The strength of composites reinforced with Grade A, plus 16 mesh, and Grade B, minus 16 plus 45 mesh, are substantially equivalent and represent a preferred embodiment of sulfur composites reinforced with plus 45 mesh asbestiform crystalline calcium sodium phosphate fibers. The strength of the sulfur composites reinforced with Franklin fibers is only slightly better than the 35-84 kg/cm$^2$ obtained for elemental sulfur without reinforcement.

EXAMPLES 8-11

Using the general preparation described in Example 2 additional batches of acicular crystalline calcium metaphosphate fibers were prepared. Samples of fibers of each of several batches were evaluated as reinforcing fibers for unmodified sulfur using the test procedure set forth in Example I providing the results summarized in Table II.

TABLE II

| Example No. | Diameter Microns | Area cm²/g | % Fiber Volume | Composite kg/cm² S | Composite kg/cm² E |
|---|---|---|---|---|---|
| 8 | 8.5 | 1705 | 21 | 450.7 | 131 × 10³ |
| 9 | 10.3 | 1415 | 25 | 431.8 | 150 × 10³ |
| 10 | 8.4 | 1724 | 27 | 544.9 | 162 × 10³ |
| 11 | 7.2 | 2027 | 29 | 463.6 | 132 × 10³ |

EXAMPLE 12

This example demonstrates the reinforcing properties of the crystalline phosphate fibers in composites formed with molten sulfur which has been chemically modified.

A beaker containing 95 parts elemental sulfur was heated to 130° C. and 5% by weight (5 parts) of cyclopentadiene was added to the melted sulfur. This mixture was allowed to react for 3 hours at 130° C. The molten mixture was poured into a stainless steel mold preheated to 130° C. which contained crystalline phosphate fibers. The mold was pressed in a hydraulic press to obtain maximum loading of the fibers and allowed to cool to ambient temperature.

Such composites reinforced with acicular calcium metalphosphate fibers had an average composite flexual strength of 5324 p.s.i. (374.3 kg/cm²) and average composite modulus of $0.61 \times 10^6$ p.s.i. ($43 \times 10^3$ kg/cm²) at 18.5% fibers by volume (24.5 wt. %).

Such composites reinforced with 18 g of asbestiform calcium sodium phosphate fibers had an average composite flexual strength of 7563 p.s.i. (531.7 kg/cm²) and an average composite modulus of $0.98 \times 10^6$ p.s.i. ($69 \times 10^3$ kg/cm²) at 19% fibers by volume (24.8 wt. %). These results were obtained with crystalline fibers prepared in a manner similar to the preparation described in Examples 1 and 2. Additional cyclopentadiene modified sulfur composites were prepared in similar manner with various batches of crystalline phosphate fibers with similar results. The average flexual composite strength for cyclopentadiene modified sulfur without fiber reinforcement was 710 p.s.i. (49./9 kg/cm²).

EXAMPLE 13

A sulfur composite reinforced with 0.5 inch chopped strand glass fibers was prepared by adding the glass fibers to molten sulfur with stirring to form a uniform mixture. The molten mixture was poured into the mold to form test specimens for evaluation as described in Example 1. This composite reinforced with glass fibers had an average composite flexual strength of 1175 p.s.i. (82.6 kg/cm²) and an average composite modulus of $0.16 \times 10^6$ p.s.i. ($11 \times 10^3$ kg/cm²) at 25.6% volume glass fiber (31.6 wt. %).

Using this procedure composites reinforced with asbestiform crystalline calcium sodium phosphate fibers and acicular crystalline calcium metaphosphate fibers had an average composite flexual strength of 6556 p.s.i. (461 kg/cm²) and an average composite modulus of $1.51 \times 10^6$ p.s.i. ($106 \times 10^3$ kg/cm²) at 23% volume (29.9 wt. %) asbestiform fibers and an average composite strength of 4878 p.s.i. (343 kg/cm²) and an average composite modulus of $1.57 \times 10^6$ p.s.i. ($110 \times 10^3$ kg/cm²) at 22.6% volume acicular fibers (29.4 wt. %).

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A composite comprising elemental sulfur and a reinforceing amount of a phosphte fiber selected from the group consisting of acicular crystalline calcium metaphosphate and asbestiform crystalline calcium sodium phosphate or calcium lithium phosphate.

2. The composite of claim 1 wherein the amount of phosphate fiber is from about 2 parts to about 100 parts per 100 parts of sulfur.

3. The composite of claim 1 wherein the phosphate fibers are asbestiform crystalline calcium sodium phosphate.

4. The composite of claim 3 wherein the phosphate fibers have an average aspect ratio of about 40:1 to about 100:1 and average diameters in the range of 1 to 20 microns.

5. The composite of claim 3 wherein the amount of phosphate fibers is from about 10 parts to about 50 parts per 100 parts of sulfur.

6. The composite of claim 1 wherein the phosphate fibers are crystalline calcium metaphosphate.

7. The composite of claim 6 wherein the phosphate fibers have an average aspect ratio greater than about 40:1 and average diameter in the range of 6 to 10 microns.

8. The composite of claim 1 further comprising from about 5 parts to about 30 parts of a chemical modifier per 100 parts sulfur.

9. The composite of claim 8 wherein the phosphate fibers are asbestiform crystalline calcium sodium phosphate.

10. The composite of claim 9 wherein the phosphate fibers have an average aspect ratio of about 40:1 and average diameters in the range of 1 to 10 microns.

* * * * *